United States Patent [19]

Boffa et al.

[11] 3,912,739

[45] Oct. 14, 1975

[54] AZA-HYDROXY-BENZANTHRONE

[75] Inventors: Gioacchino Boffa; Gian Paolo Chiusoli, both of Novara, Italy

[73] Assignee: Montecatini Edison S.p.A., Milan, Italy

[22] Filed: Mar. 5, 1970

[21] Appl. No.: 16,989

[30] Foreign Application Priority Data

Mar. 7, 1969 Italy.................................. 13784/69

[52] U.S. Cl. .............................................. 260/278
[51] Int. Cl.[2]........................................... C09B 5/14
[58] Field of Search............................ 260/272, 278

[56] References Cited
UNITED STATES PATENTS

| | | | |
|---|---|---|---|
| 2,086,704 | 7/1937 | Ebel............................. | 260/272 X |
| 3,507,872 | 4/1970 | Hegar........................... | 260/278 X |
| 3,678,053 | 7/1972 | Boffa et al..................... | 260/278 |

OTHER PUBLICATIONS

King et al., Jour. Chem. Soc. (London), 1954, pp. 936–938.
"The Colour Index," p. 3488, No. 60000.

*Primary Examiner*—Donald G. Daus

[57] ABSTRACT

There is disclosed a new product of the benzanthrone class, namely, 1-aza-2-hydroxy-benzanthrone, useful in the synthesis of vat and azoic dyes. Briefly, the new product is obtained by reacting 1,4-napthoquinone with methyl-3,5-hexadienoate, under heating, and then treating the resulting solid product with excess $NH_3$ in anhydrous alcoholic solution, and finally recovering the 1-aza-2-hydroxy benzanthrone.

4 Claims, No Drawings

AZA-HYDROXY-BENZANTHRONE

The new product of this invention has the formula

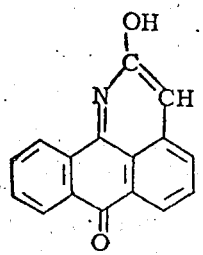

It is yellow in color, melts at 249°C with decomposition, and crystallizes from n-butanol.

The invention also provides a two-step method for the preparation of the new product.

In the first step, 1,4-naphthoquinone and methyl-3,5-hexadienoate, in about equimolar quantities, are heated together in an inert solvent, preferably in methanol or ethanol, at reflux temperature. The solid thus obtained (compound I) is filtered from the alcoholic solution and cooled at 0°C to +20°C.

In the second step, compound I is treated with an excess of $NH_3$, in anhydrous alcoholic solution, at a temperature of from −20°C to +30°C, but preferably at room temperature. Thereupon, an alkaline hydroxide is added and air is passed through the mass, at atmospheric pressure and room temperature. The mixture is then diluted with water, filtered, and the red filtrate is acidified to precipitate the pure aza-hydroxy-benzathrone, Compound II.

The two steps of the process can be represented by the following reactions:

1)

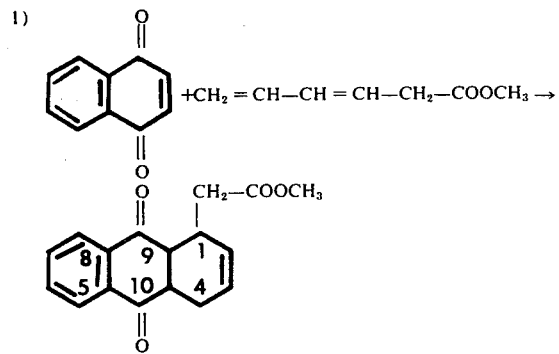

methyl-naphthoquinone-hexadienoate-1 (1,4,4a,9a-tetrahydro-anthraquinone) -acetate. (adduct).

2)

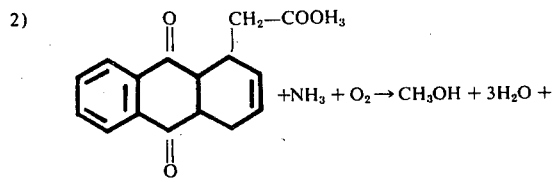

In the second step, at least 10 moles of ammonia and from 1 to 5 moles of alkalimetal hydroxide, preferably KOH, are used for each mole of starting naphthoquinone. The preferred alcohols are methanol and ethanol.

As already stated, the new product (compound II) is useful as an intermediate in the synthesis of vat and azoic dyestuffs.

The following examples are given to illustrate the invention and are not intended as limiting the invention.

EXAMPLE 1

This example is given to illustrate the preparation of compound I.

34.3 g of 1,4-naphthoquinone, 27.4 g of methyl-3,5-hexadienoate (the methyl ester of pentadiene carboxylic acid), and 65 ml of 99% ethanol were boiled at reflux temperature under an $N_2$ atmosphere for 6 hours. The solution thus obtained was cooled to 10°C, and the solid which separated was filtered and washed on the filter with 38 ml of 99% ethanol, after which it was dried in the air. The product crystallized from methanol or ethanol in the form of white crystals having a melting point of 88°C.

EXAMPLE 2

34.3 g of 1,4-naphthoquinone, 27.4 g of methyl-3,5-hexadienoate, and 65 ml of methanol were boiled at reflux temperature for 6 hours, in a nitrogen atmosphere. The solution thus obtained was introduced into 940 ml of an anhydrous methanol solution saturated by $NH_3$, and allowed to remain in said solution for 3 days under atmospheric pressure and at room temperature. Thereafter, a lively current of air was introduced into the reaction mixture for about one hour, to remove most of the $NH_3$. Finally, 100 ml of methanol containing 10 g of KOH, and 250 ml of water were added. Air was bubbled through the mixture for another four hours, also at room temperature. The resulting red solution was diluted with 1300 ml of water, filtered, and acidified. The solid precipitate was filtered, washed with water until the acidity completely disappeared, and finally dried in vacuo on a water bath.

34.6 compound II were obtained. The IR, NMR and centesimal analyses showed that compound II was 1-aza-2-hydroxy-benzanthrone.

The ready reactivity of compound II with p-toluenesulphonyl chloride in pyridine solution, and with diazomethane in dioxane solution, with the forma-

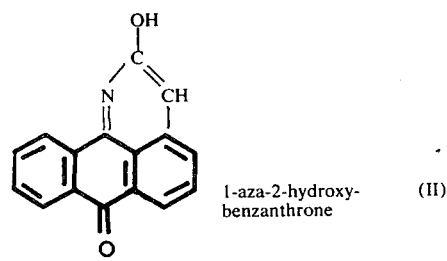

1-aza-2-hydroxy-benzanthrone (II)

tion of quantitative yields of, respectively, the p-toluenesulphonic ester and the methyl ester, proved the existence of the OH group in compound II.

What we claim is:

1. 1-Aza-2-hydroxy-benzathrone of the formula

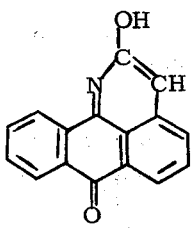

2. Process for preparing 1-aza-2-hydroxy-benzathrone characterized in that a. 1,4-naphthoquinone and methyl-3,5-hexadienoate are reacted, in about equimolar quantities, and the adduct, methyl-naphthoquinone-hexadienoate thus formed, is separated in the form of white crystals; and b. said adduct is treated with an excess of $NH_3$ in an hydrous alcoholic solution, an alkaline hydroxide is added, air is passed through the mass, and the resulting solution is acidified to precipitate the 1-aza-2-hydroxy-benzanthrone.

3. The process according to claim 2, further characterized in that step (a) thereof is carried out in a solvent selected from the group consisting of methanol and ethanol, at reflux temperature.

4. The process according to claim 2, characterized in that the treatment of the adduct with $NH_3$ in step (b) is carried out at room temperature.

* * * * *